May 20, 1947.　　　　R. T. ANDERSON　　　　2,420,927
SCREENING AND CONVEYING MEANS FOR THE SOLIDS OF AN OIL SEPARATING TANK
Filed Aug. 26, 1944　　　3 Sheets-Sheet 1
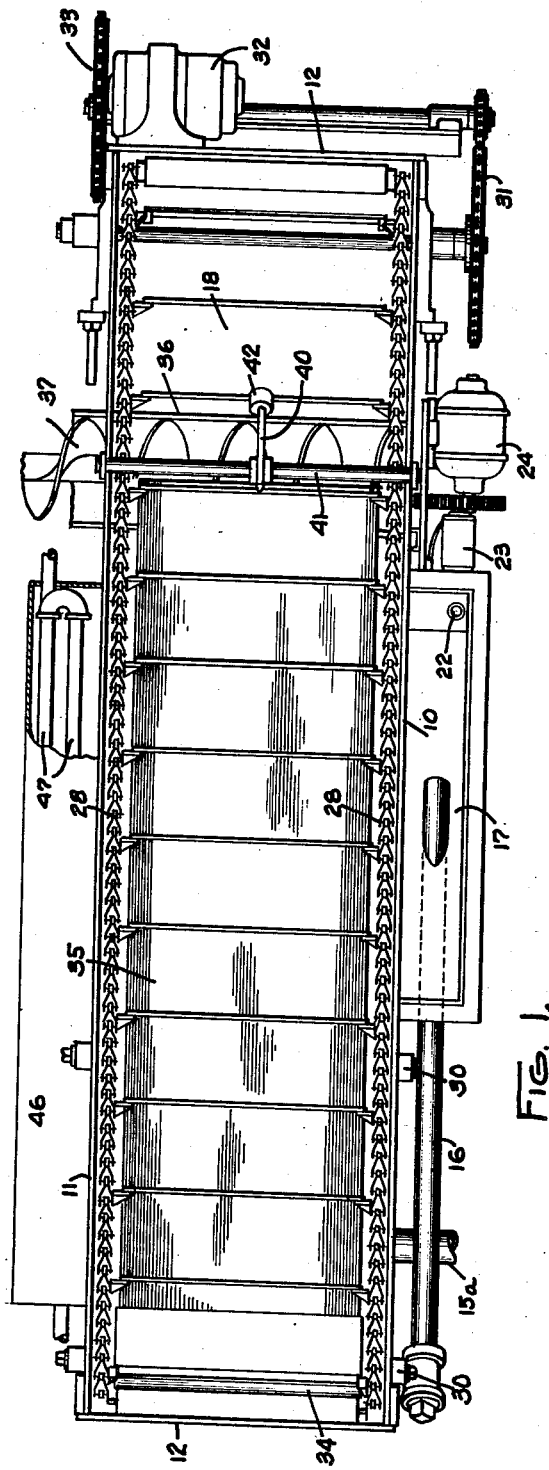
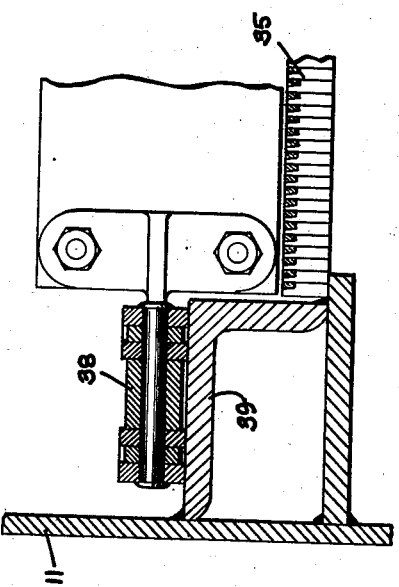
*INVENTOR.*
RAYMOND T. ANDERSON
BY
*Hyde and Meyer*
*ATTORNEYS.*

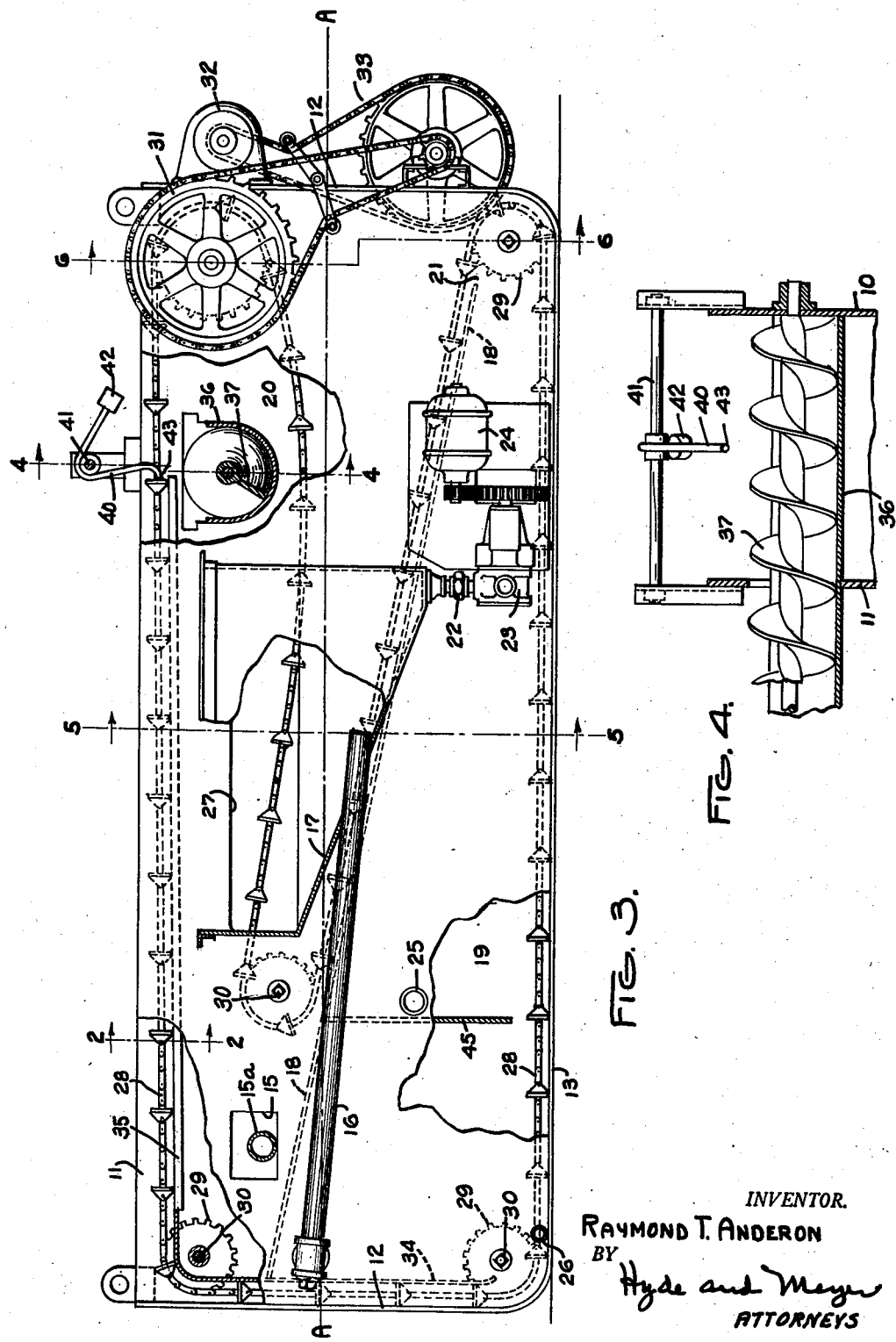

INVENTOR.
RAYMOND T. ANDERSON
BY
Hyde and Meyer
ATTORNEYS.

Patented May 20, 1947

2,420,927

UNITED STATES PATENT OFFICE 2,420,927

SCREENING AND CONVEYING MEANS FOR THE SOLIDS OF OIL SEPARATING TANKS

Raymond T. Anderson, Lakewood, Ohio, assignor, by mesne assignments, to The V. D. Anderson Company, Cleveland, Ohio, a corporation of Ohio Application August 26, 1944, Serial No. 551,366

7 Claims. (Cl. 210—43)

1

This invention relates to apparatus for settling oil for the purpose of removing foots, thereby to assist in clarification and reducing the time and effort usually necessary in a filtering or other separating process.

In the preparation of certain vegetable oils, such as oil made from cotton seed, flax seed, castor beans, or other oil bearing seeds or nuts, or the separation of animal oils of various kinds by pressure in a press, the oily product usually contains a certain proportion of finely divided solid material known as "foots," or as "crack-lings" in the case of animal oils. This material usually is difficult to separate and soon chokes filters or filter presses used for the purpose. Its presence is undesirable on account of the loss of clarity of the finished product and for other reasons.

The present invention has for its object to provide an improved settling tank for such oil, in which the oily product of one or more presses, such as continuous screw or hydraulic presses, may be permitted to travel slowly but continuously, some oil being withdrawn and returned to the press for cooling purposes, while other oil is separately withdrawn as finished product, while at the same time causing or permitting the foots to settle and separate and be collected and discharged as a separate solid mass for return to the press for treatment there with fresh raw material.

A further object is to provide an improved settling tank of the character described provided with a plurality of settling surfaces on which the foots collects and from which it is scraped, drained and carried to a discharge conveyor.

Still another object is to provide means for jarring or agitating the collecting device to reduce the tendency of the foots to adhere thereto.

Still another object is to provide means for avoiding the building up of large masses of foam, by draining the same, as formed, to a discharge outlet where it is combined with other oil.

Another object is to provide improved means for maintaining fluid some of the heavier animal or other oils, to insure free flow and permit more rapid settling of solids therefrom.

Further objects of the invention in part are obvious and in part will appear more in detail hereinafter.

In the drawings, which represent one suitable embodiment of the invention Fig. 1 is a plan view;

Fig. 2 is a detail section, on a larger scale, on the line 2—2, Fig. 3;

2

Fig. 3 is a front elevation, parts of the front casing wall being broken out;

Fig. 4 is a detail sectional view on the line 4—4, Fig. 3;

Figure 6:
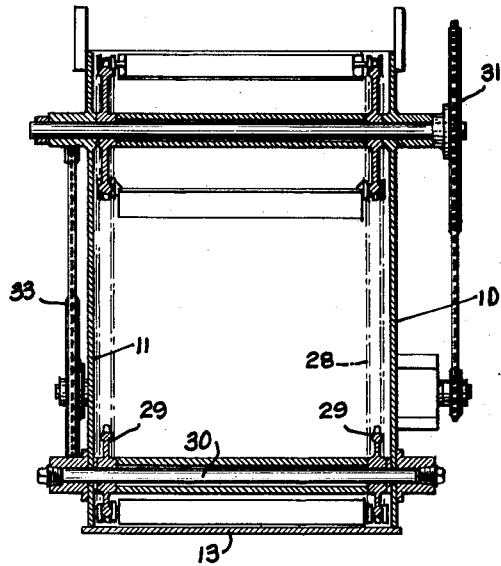
Fig. 6 is a similar view on the line 6—6, Fig. 3.
Figure 5:
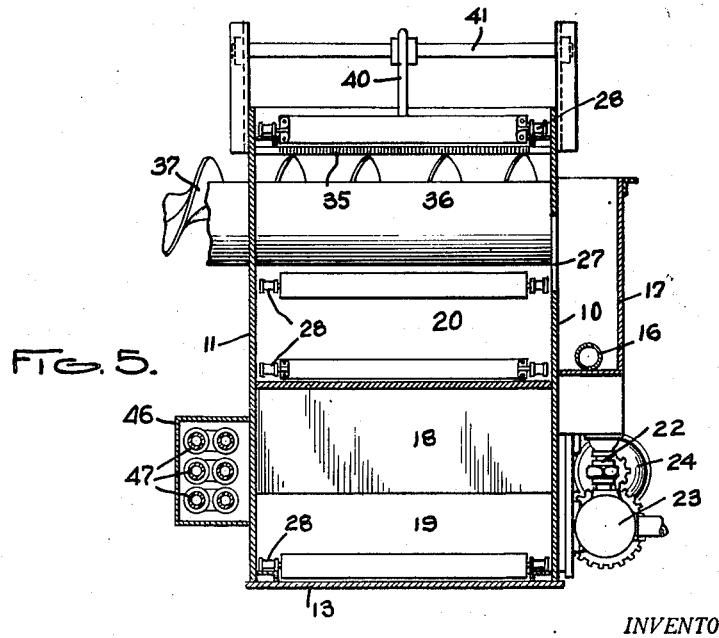
Fig. 5 is a sectional elevation on the line 5—5, Fig. 3.

The apparatus shown in the drawings for the purpose of illustration, comprises a generally rectangular tank, usually made of sheet metal, having front and rear walls, 10, 11, end walls 12 and bottom 13. Its top may be open, or it may be partly or wholly closed, as by a cover plate (not shown) although that is not essential. In one of said walls is an opening 15 through which may be inserted the discharge end of a screw conveyor, pipe, or conduit, shown conventionally at 15a, for delivery to the tank of the oil which it is desired to treat or settle, such as cotton seed, flax seed, or other vegetable oil, or animal oil. Usually such oil comes from one or a battery of several continuous or other presses in which it has been expressed from solid material containing the oil, and to which press or presses it is desirable to return the separated foots, and also a part of the oil for use as a cooling medium for the working press parts, such as the foraminous barrel and screw (not shown).

In use of the settling tank, an oil level is maintained therein at about the level of the line A, excess oil overflowing and being discharged by way of an outlet pipe 16 opening into the tank at the level A and sloping downwardly to a foam collecting trough 17 to be referred to hereafter.

Below the supply opening 15 is a sloping apron 18, which is a plain imperforate metal sheet secured to the tank walls and extending downwardly from a point at one end of the tank above level A nearly to the other end and nearly to the bottom of the tank. This divides the space within the tank into upper and lower chambers 20, 19 which communicate by way of the long narrow opening 21 at the lower end of the apron. Oil delivered at the inlet 15 is compelled to flow to the right in Fig. 3, down through opening 21 and then to the left and upwardly to reach the discharge pipe 16, providing a long path of travel and more time for settling purposes.

Oil is withdrawn from the system at two points. The product oil, which is withdrawn permanently, is taken from the bottom of the foam collector 17 by way of a drain pipe 22 communicating with a suitable pump 23 driven by motor 24, by means of which the product oil may be pumped to any desirable receiving vessel.

Other oil is taken out through an outlet 25 by a similar pump and motor unit (not shown) which may return it to the press or presses from which it came to be showered upon or circulated through the working parts for cooling purposes. This oil is usually cooled in heat exchangers (not shown) before showering on working parts. Such oil joins that which is expressed from the raw material and thus finds its way back to the settling tank, as is usual.

A bottom drain outlet 26 may also be provided for emptying the tank, when desired.

The foam collector is a relatively small vessel attached to or mounted upon one of the tank walls, such as front wall 10. It is provided with a floor or bottom sloping toward the drain pipe 22 and communicates with the upper chamber 20 of the tank by one or more openings 27 through its front wall, preferably at a level several inches above level A. The foam, which usually collects upon the upper surface of the oil in the tank, builds up until finally it begins to overflow into the foam collector, where it trickles down and joins the main stream of product oil. Such foam, though containing some fine foots, may be withdrawn permanently.

During the travel of oil from the inlet 15 to the outlets 25, 16 it moves gradually, with settling of the foots to the bottoms of the two chambers 19, 20. Means is provided to separate and remove such foots. The means shown comprises a series of scrapers or paddles, in the form of long narrow transversely extending blades, connected at intervals to two endless chains 28 mounted upon sprockets 29 on cross shafts 30, all within the tank. One shaft 30 extends through the tank wall, outside of which it is provided with a sprocket 31 driven by the motor 32, through speed reducing chain and sprocket mechanism conventionally shown at 33, Fig. 1.

Four of the shafts 30 are located in the four corners of the tank, as viewed from the front in Fig. 3, the fifth being located between its end and just above the oil level, near the inlet 15. One stretch of the conveyor travels downwardly to the right along the upper surface of apron 18, the next to the left along the tank bottom 13, the next upwardly in the narrow space between the end wall 12 and an inner parallel wall 34, the next to the right above a suitable filter grid or screen 35, and the last to the left to the point of starting. The several blades or paddles move along the surfaces beneath them without actual contact and scrape off and advance the settled foots, carry it up as an elevator, and finally drag it over the screen, through which any remaining oil drains to the main body. Usually the edges of the paddles or blades are 1/8 inch or so above the tank bottom and screen when moving over them. Finally the foots are pushed over the edge of the screen and fall into a trough 36 along which a spiral or other conveyor 37 moves the foots outwardly through the tank side wall for discharge to any receiver, or return to the press.

To reduce friction the several blades of the conveyor are provided at their ends with sleeves 38 which enter the sprocket recesses and which travel on guides or tracks 39 beneath them to hold the blade edges away from actual contact with the tank bottom and screen.

Means is also provided to jar or agitate the several conveyor blades just as they leave the screen and while they are above the trough 36, to assist in shaking loose any foots which might otherwise tend to cling to the blades. The means shown is actuated by the blades themselves. It comprises a two armed knocker 40 attached to the middle of a shaft 41 journalled in the front and rear walls of the tank. One arm carries a weight 42 and the other is provided with a bent hammer abutment 43.

Fig. 3 shows the parts in the positions they occupy at the moment of impact of the hammer upon a blade. Now, as the chain travels to the right, the blade engaged by the hammer moves the hammer to the right, turning the knocker counterclockwise until the hammer rises above and is released by the blade, whereupon the weight moves it reversely, applying the hammer to the next blade with a sudden blow, producing the desired jarring effect.

In use of the apparatus, the oil expressed or produced in one or a battery of presses is delivered continuously to the settling tank by inlet pipe 15a, from which it falls to apron 18, just above the oil level A. As it flows to the right in chamber 20 the foots settle upon said apron and are advanced by the conveyor to the opening 21 where they fall to the tank bottom. Both oil and foots now travel to the left, with further opportunity for settling of foots. A portion of the oil is withdrawn at the outlet 25 and is returned to the presses, for use as a cooling agent, as described. This outlet is above the bottom and in advance of a baffle wall 45, depending from apron 18 or attached to the tank walls, and consequently in a sort of back water where the oil is more or less free from foots. Product oil is withdrawn through pipe 16 at the point most remote from the inlet and where all oil has had full opportunity to settle with flow beyond the baffle reduced to a minimum.

Any foam which collects upon the main body of oil overflows into the collector 17 and joins the stream of product oil. When the foots carried up by the blades, acting as an elevator, reaches the screen 35 it is dragged along it and any free oil drains back to the main body through the screen openings. At the end of the screen the blades are jarred to free them from clinging foots and the solid product is ejected by conveyor 37.

When the device is used for greases or the like, such as are recovered for example from animal fats, the heavier greases may be maintained fluid by a suitable heater, such as an elongated chambered casing 46 attached to one or several walls of the tank, through which steam or a heating medium may be circulated by the pipes 47.

The tank may vary in size, according to the duty to be performed, such as according to the number of presses in the battery served by one tank, or the character of the raw material and the quantity of oil recovered therefrom. Typical tanks made for the purpose vary in height from 4 to 6 feet, in width from 2½ to 4 feet, in length from 6 to 16 feet, and in liquid capacity up to the overflow outlet for product oil from 250 to 1500 gallons.

Advantages of the invention other than those referred to will readily occur to those skilled in the art.

What I claim is:

1. Apparatus of the character described, comprising a tank provided near one end and above its bottom with a product overflow outlet opening and at a higher level with an inlet opening, an apron mounted in said tank and sloping downwardly from a point between said openings toward the other end of the tank, a horizontal screen above the inlet opening, the tank being provided below one end of the screen with an inner wall spaced from the adjacent tank and wall and forming therewith a narrow elevator passage, a receiver below the other end of said screen, a series of scrapers, flexible members connecting them in endless series form, operating means therefor, and guide means for said scrapers mounted on the tank, said operating and guide means being arranged to cause said scrapers to travel first downwardly along said apron, then horizontally along the tank bottom, then upwardly through said elevator passage to and along said screen, whereby said scrapers collect solid matter settling from liquid supplied to said tank and conduct the same to said receiver.

2. Apparatus of the character described in claim 1, in which the tank is also provided with an outlet for cooling liquid located below said product outlet, and including a vertical baffle located between said outlets.

3. Apparatus of the character described in claim 1, including means for jarring each scraper as it leaves the end of the screen for freeing solid matter therefrom and discharging it to said receiver.

4. Apparatus of the character described in claim 1, including means for jarring each scraper as it leaves the end of the screen for freeing solid matter therefrom and discharging it to said receiver, said means comprising a swinging member having a hammer portion depending in front of the advancing scrapers and biased to tend to move toward said scrapers and adapted to be engaged by each scraper and to be lifted thereby and released for impact engagement with the next scraper.

5. Apparatus of the character described in claim 1, including a foam collector mounted upon the tank and to which the product outlet drains, the tank being also provided with a foam overflow opening to said collector at a level above said product outlet opening, said collector having a drain outlet below both of said overflow openings.

6. Apparatus of the character described in claim 1, including heating means mounted upon the tank below the product outlet opening, and means for supplying heating medium thereto to heat the liquid within the tank.

7. Apparatus of the character described in claim 1, said receiver being located above the level of the overflow outlet opening and extending through a wall of the tank, conveying means in said receiver for conducting material collected therein to a point outside the tank, and operating means for said conveying means.

RAYMOND T. ANDERSON.

REFERENCES CITED

The following references are of record in the file of this patent:

UNITED STATES PATENTS

| Number | Name | Date |
|---|---|---|
| 2,254,176 | Fischer | Aug. 26, 1941 |
| 2,233,448 | Fischer | Mar. 4, 1941 |
| 2,309,002 | Nichols | Jan. 19, 1943 |
| 2,064,792 | Fischer | Dec. 15, 1936 |
| 1,231,409 | Moore | June 26, 1917 |
| 2,022,661 | Fortier | Dec. 3, 1935 |
| 2,219,007 | Dostal | Oct. 22, 1940 |

FOREIGN PATENTS

| Number | Country | Date |
|---|---|---|
| 217,025 | Great Britain | June 12, 1924 |